Oct. 18, 1949.  J. J. BROIDO  2,485,255
PRESSER AND FEEDING CLAW UNIT FOR
MOVING-PICTURE APPARATUS
Filed Aug. 17, 1945  3 Sheets—Sheet 1

Jacques Jean Broido
INVENTOR
By
his ATTY.

Oct. 18, 1949.　　　　J. J. BROIDO　　　　2,485,255
PRESSER AND FEEDING CLAW UNIT FOR
MOVING-PICTURE APPARATUS

Filed Aug. 17, 1945　　　　　　　　　　3 Sheets-Sheet 2

Jacques Jean Broido
INVENTOR

By [signature]
his ATTY.

Oct. 18, 1949.   J. J. BROIDO   2,485,255
PRESSER AND FEEDING CLAW UNIT FOR
MOVING-PICTURE APPARATUS
Filed Aug. 17, 1945   3 Sheets-Sheet 3

Jacques Jean Broido
INVENTOR
By [signature] his ATT'y.

Patented Oct. 18, 1949

2,485,255

UNITED STATES PATENT OFFICE 2,485,255

PRESSER AND FEEDING CLAW UNIT FOR MOVING-PICTURE APPARATUS

Jacques Jean Broïdo, Joinville-le-Pont, France

Application August 17, 1945, Serial No. 611,154
In France March 17, 1943

Section 1, Public Law 690, August 8, 1946
Patent expires March 17, 1963

3 Claims. (Cl. 88—18.4)

1

This invention has for its object to provide a presser and feeding claw for motion picture apparatus, and more particularly cameras and film magazines with self-contained feeding means, with a view to facilitate the construction and improve the operation.

In the cameras in present use, the presser which maintains the film within the gate adjacent the exposure window and the film feeding claw which cooperates with the perforations of the film are disposed on opposite sides of the film, the claw being generally disposed between the objective and the gate, while the presser is located behind the window. By reason of the space required for the claw and the control means therefor, these members must be disposed clearly above the window, as but little space is available forwardly of the gate, especially when objectives of short focal length are employed. This is detrimental to the quality of the images impressed on the film or projected on the screen, and experience shows that the fixity of the images, the perfection of their framing, etc. are the best when the claw attacks the film perforations close to the window, especially when the camera comprises a single claw attacking a row of lateral perforations of the film.

The independence between the claw and the presser, which also exists when the claw is arranged behind a gate constituted by a movable forward plate and a stationary rear presser, is detrimental to the accuracy of their movements, so that any change in the size of the images in a given apparatus involves for the maker important modifications in the whole structure of the camera. Furthermore, threading of the film, upon loading the apparatus, calls for the temporary retraction of both the claw and the presser, which makes the operation relatively complicated.

This invention, which obviates these various defects, resides in that the claw is guided in suitable guide-means provided in the presser and opening on the operative face of the presser to clear the way to the claw adjacent the exposure window.

This arrangement has the following advantages:

1. Provided that the presser is accurately positioned or centered with respect to the film gate, the correct positioning of the film with respect to the exposure window and an accurate attack of the film perforations are ensured.

2. The claw may be readily disposed behind the film.

3. The claw attacks the film perforations as

2 close to the exposure window as may be desired, i. e. at the very level thereof when the film has lateral perforations.

4. The partial or total combination of the claw-presser into one unit ensures automatic retraction of the claw when the presser is swung backwards for the purpose of threading the film, without interference by the claw.

5. The claw and presser unit is readily detachable and makes any change in image size very easy, thus permitting to provide the same camera construction for different film sizes.

The pivot pin for the presser and the control shaft for the feeding claw may be distinct.

However, according to an important feature of the invention, the control shaft which carries both the crank connection with the claw and the driving pinion therefor, is preferably located in a bore extending through the presser and forms the pivot pin thereof, said shaft being surrounded by a bushing adapted to be secured on the camera body.

Said bushing may be advantageously constituted by a cylindrical sleeve, intended to be tightened in a collar fast to the camera body.

In apparatus of medium precision, with single-acting claw, the required motion of the claw may be obtained through the combined action of the crank, a recall spring and a guiding abutment for the claw in the presser.

In apparatus of greater precision, with reversible drive (double-acting claw), the motion of the claw is obtained through the combined action of the crank and a cam or slot of suitable curvature, provided in the claw and cooperating with a pin fast to the presser, or vice versa.

The presser may be of moulded metal or plastic material or it may be formed by assembling (riveting, clamping or electrically welding) two wings and a plate cut out from a metal sheet, said plate being optionally stamped or bent, while the claw is guided between the two wings.

Adjacent the exposure window, the presser is preferably provided with a small yieldingly pressed skid of solid or cup-like formation, operated by springs hooked in lugs cut out in the wings, or any other suitable protruding elements of the presser.

Further features of the invention will be apparent from the following description, with reference to the accompanying drawings, which show, by way of example, different embodiments of the invention, and in which.

Figure 6:
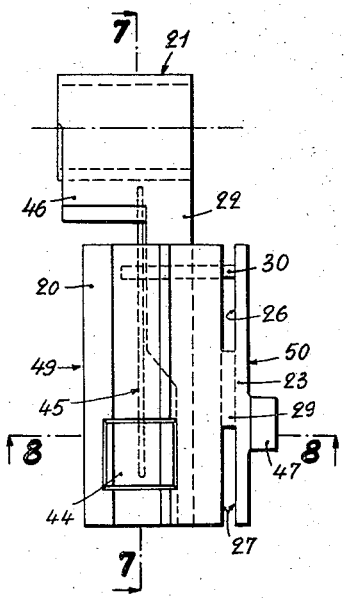
Fig. 6 is a corresponding elevational view, showing the presser alone, through line 6—6 of Fig. 5 or 7.
Figure 7:
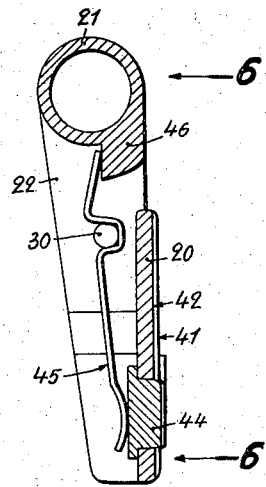
Figure 8:
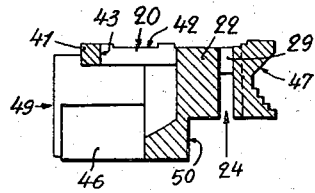
Figure 9:
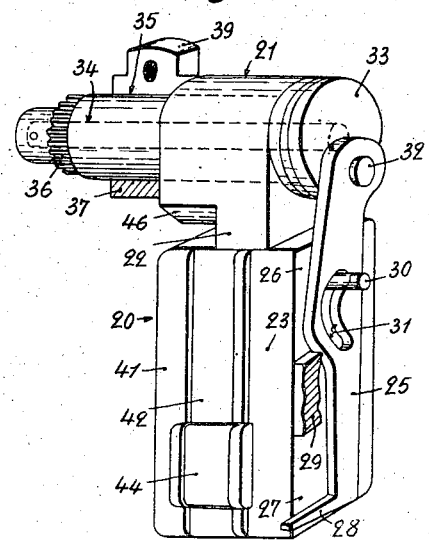

Figs. 7 and 8 are sectional views through lines 7—7 and 8—8 of Fig. 6, respectively; and Fig. 9 is a perspective view, with a part broken away, showing the cam or slot for the claw.

Figure 1:
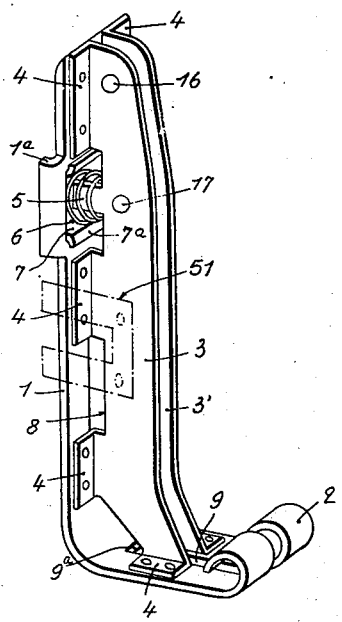
Fig. 1 is a perspective view showing a presser made of sheet metal, the claw member being removed.
Figure 2:
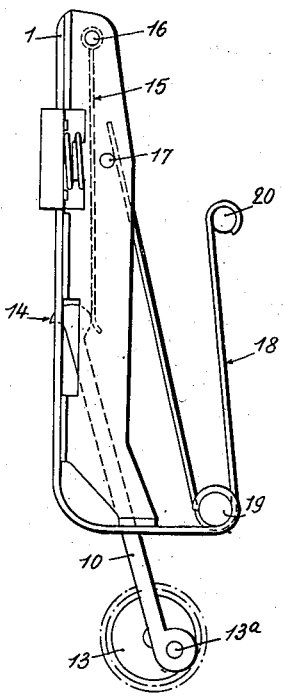
Fig. 2 is a side view corresponding to Fig. 1, with a single-acting claw in operative position.

In the embodiment shown in Figs. 1 and 2, the presser is constituted by a suitably curved plate 1 forming a strap 2 for pivotal connection with a pivot pin. This plate is adapted to be arranged opposite a stationary plate (not shown) belonging to the front part of a motion picture camera, to form the film gate.

Opposite the film exposure window, plate 1 is provided with lateral curved lugs 1a adapted to engage said stationary plate, on both sides of the film, for defining a passage in which the film is guided without being actually pressed.

Plate 1 is made rigid by two wings or cheeks 3 and 3', provided with right angular flanges 4, secured to the back face of plate 1 by any suitable means (riveting, electric welding and the like).

The edges of cheeks 3 and 3' are provided with two lugs 5 (better visible in Fig. 4) serving for centering a spring 6 which is supported by the cheeks and constantly urges outwardly a rectangular cup 7 forming a pressure pad adapted to press the film against the exposure window and to maintain the film perfectly flat behind the window.

The edges of cup 7 flare outwardly as shown at 7a, to prevent the cup from escaping when the presser is tipped backwards for the purpose of threading the film when loading the camera.

The stiffening cheeks 3 and 3' serve as guides for the film feeding claw, slots 8 and 9 being provided in plate 1 for the passage of said claw.

The claw may have different shapes according as it is adapted to merely feed the film downwards in its normal direction or to feed in both directions.

In the first case (Figs. 1 and 2), the claw consists by a kind of pawl 10 having a tooth 14 and pivotally connected to an eccentric crank pin 13a of a disc 13. A spring 15, supported by a spacing element 16 and limited in movement by a spring element 17 bracing the cheeks 3 and 3', exerts on the claw a pressure which is just sufficient to maintain the claw in contact with the film, the release of the claw from the perforations resulting from the engagement of the claw with one edge 9a of slot 9.

A tongs-shaped spring 18, wound around the pivot axis 19 of the presser and supported by an auxiliary pillar 20 of the camera, maintains the presser against the stationary guide-plate.

Figure 3:
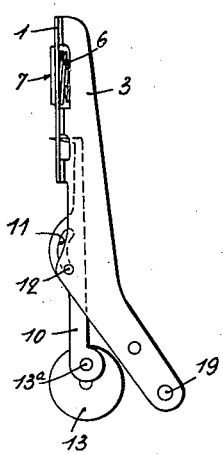
Fig. 3 is a view similar to Fig. 2, showing a modification and comprising a double-acting claw.

A reversible feeding claw may have the shape shown in Fig. 3, and provided with a guiding cam or slot 11, cooperating with a pin 12 of the presser, so as to impart to the claw, in combination with the motion of the driving crank 13, a suitable trajectory, in the known manner.

It is evident that modifications of form and detail may be made to the presser thus designed in accordance with the arrangement of the various elements of the camera.

Figure 4:
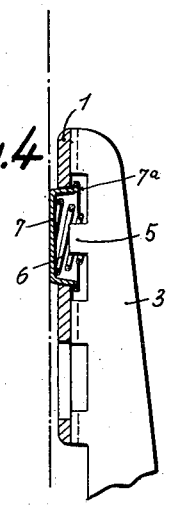
Fig. 4 is an enlarged view showing a part of Fig. 3.

Thus, as shown in Figs. 3 and 4, plate 1 of Figs. 1 and 2 may consist of a simple metal band stiffened by the two cheeks 3, 3' carrying pin 12 with the pivot axis 19 of the presser passing therethrough.

In the embodiment shown in Figs. 5 to 9, the presser is of moulded metal or plastic material and comprises a plate portion 20, a barrel 21 and a stiffening rib 22. The latter is laterally extended by a boss 23, formed with a slot 24 accommodating the shank 25 of the claw. Slot 24 opens on the operative surface of the presser through slots 26 and 27 clearing the way to the claw shank 25 and the tooth 28, respectively, slots 26, 27 being separated from each other by a connecting pillar 29. Extending through slot 26 is a pin 30, cooperating with a cam or slot 31 of claw 25, the shank of which is pivotally connected with the crankpin 32 of a disc 33, keyed to the end of a shaft 34. The latter is threaded in a sleeve 35, forming a bushing in the aforesaid barrel 21 (Fig. 9). Keyed to shaft 34, beyond sleeve 35, is a pinion 36, intended to mesh with a driving pinion of the camera, for actuating disc 33. The outer diameter of pinion 36 is less than or equal to that of sleeve 35, so as to enable the whole assembly to be passed through a split collar 37, secured to the camera body and having two lugs 38, 39 which may be brought together by a screw 40, for locking the sleeve in the collar.

The presser and claw form an integral unit, whose sole connection with the camera is collar 37, and which can thus be readily mounted or removed.

The operative face 41 of the presser plate forms a shallow groove 42, intended to prevent the impressed portion of the film F from rubbing against said face 41. Opposite the exposure window E in the film gate, the presser is formed with an aperture 43 engaged by a pressure pad 44, whose surface constitutes, in its operative position, the extension of the surfaces 41, 42 of the plate. Pad 44 is pressed against the film by a spring wire 45, supported by pin 30 and a boss 46 of barrel 21.

Figure 5:
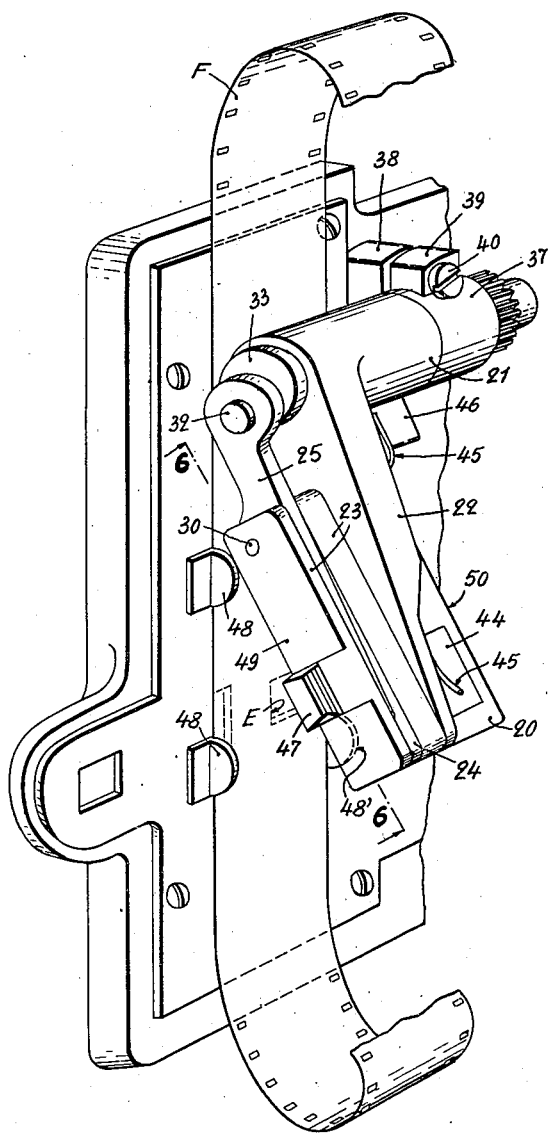
Fig. 5 is a perspective view showing a moulded presser and claw unit.

To facilitate threading of the film, the presser is provided with a lateral projection 47, adapted to be seized by the operator for the purpose of swinging the presser backwards (Fig. 5). In this movement, the claw is also moved, thereby clearing the way to the film for threading purposes.

In order to accurately center the film with respect to the exposure window E and the perforations of the film F, with respect to the claw, the film and the presser are guided by tongues 48, 48' of the gate plate, engaging the film edges and the side walls 49, 50 of the presser.

In the arrangement according to Figs. 1 to 3, such guiding may be effected by elastic elements, as shown in dot and dash line at 51, secured to the body of the camera or magazine and the cover therefor.

The drawing refers to a film having a single row of lateral perforations, engaged by a single claw, but it is clear that the invention also applies, with minor modifications in details, to a film with central perforations (the claw attacking the perforations at a small distance from the exposure window) or to the case of a double claw attacking two rows of lateral perforations.

Broadly, the invention is not limited to the particular embodiments described and shown, which have been given solely by way of example.

Having now described my invention, what I claim as new and desired to secure by Letters Patent is:

1. A presser and feeding claw unit for moving picture apparatus, comprising a presser having a transverse bore and a slot opening on the operative surface thereof, a claw movable in and guided by the side walls of said slot, crank means operatively connected to said claw, a shaft for said crank means extending through said bore, a driving pinion keyed to said shaft, and a bushing for supporting a portion of said shaft and adapted to be secured to the camera body.

2. A unit as claimed in claim 1, wherein said bushing consists of a cylindrical sleeve adapted to engage and to be tightened in a slotted collar of the body of the moving picture apparatus.

3. In a unit as claimed in claim 1, with double-acting claw, a curved slot and a cam follower connection adapted to impart to the claw, in combination with said crank means, a predetermined trajectory, the elements of said connection being respectively associated with said presser and said claw.

JACQUES JEAN BROÏDO.

REFERENCES CITED

The following references are of record in the file of this patent:

UNITED STATES PATENTS

| Number | Name | Date |
|---|---|---|
| 1,304,976 | Helsel | May 27, 1919 |
| 1,336,639 | Leonard | Apr. 13, 1920 |
| 1,706,089 | Victor | Mar 19, 1929 |
| 2,362,818 | Herzka | Nov. 14, 1944 |